Oct. 1, 1929.   T. A. KILLMAN   1,730,219
COMBINED MIXER AND AERATOR
Filed Feb. 16, 1929
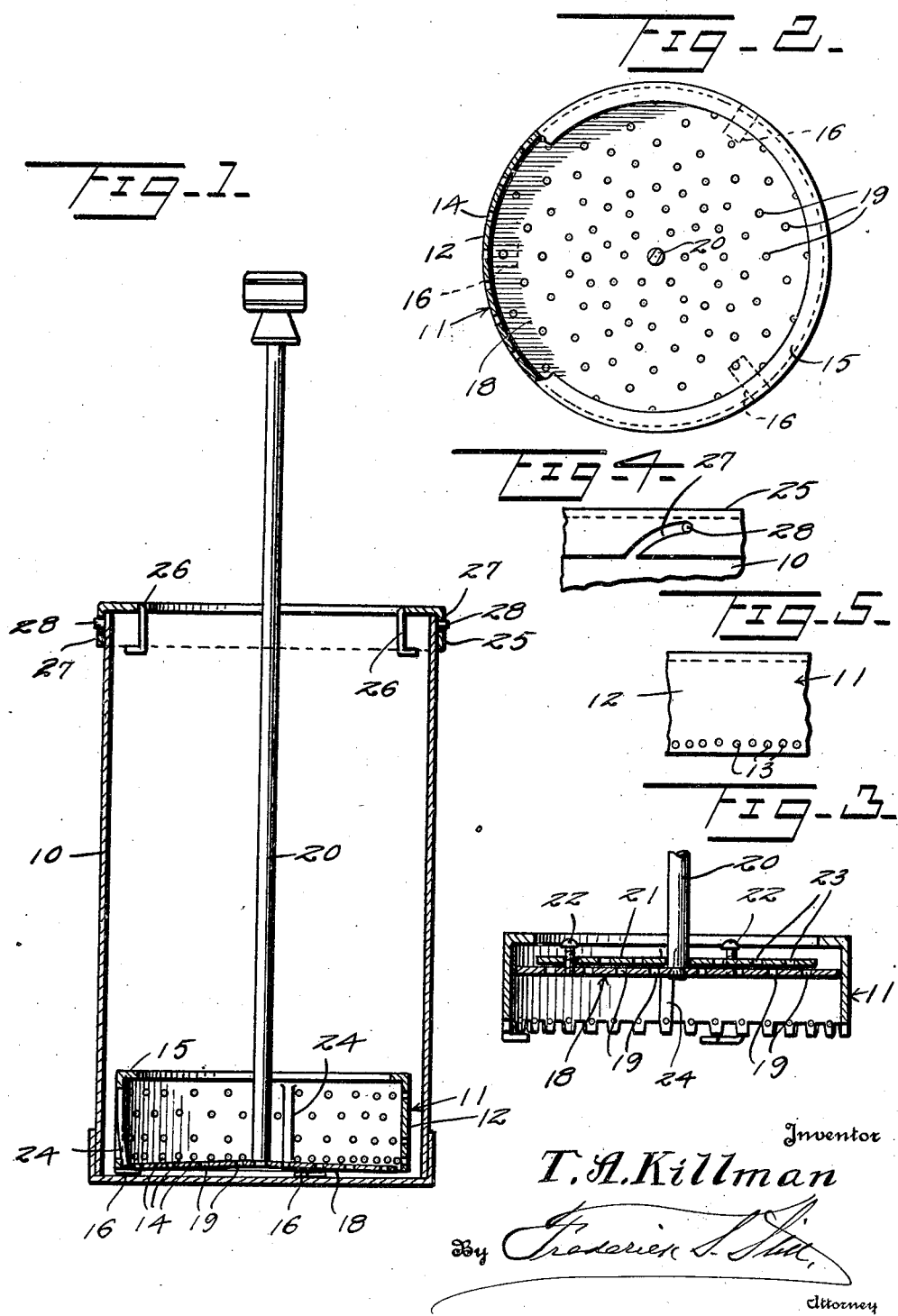

Patented Oct. 1, 1929

1,730,219

UNITED STATES PATENT OFFICE

THOMAS A. KILLMAN, OF NASHVILLE, TENNESSEE

COMBINED MIXER AND AERATOR

Application filed February 16, 1929. Serial No. 340,617.

This invention relates to combined mixers and aerators, and more particularly to apparatus for use in mixing or beating and aerating eggs, cream or the like.

An important object of the invention is to produce a device of this character of such construction that the aeration of the material being treated is materially expedited and a superior aeration effected.

As is well known to those familiar with the art, the proper beating or whipping of eggs and cream depends principally upon the incorporation in the fluid being treated of a certain quantity of air. Apparatus employed for this purpose is usually of such character that bubbles formed in the material are broken substantially as rapidly as they are formed so that it requires a very considerable time to effect the desired result, particularly where a stiff product is desired. Accordingly, an important object of this invention is to provide an apparatus which will incorporate in such fluids as rapidly as possible air which is so delivered that it forms fine bubbles and rapidly subdivides the substance and causes it to assume the desired state and which is so arranged that breakage of these bubbles after formation thereof is reduced to a minimum.

A still further object of the invention is to produce a device of this character which may be very readily manufactured, which will be durable and efficient in service, and which will be a general improvement in the art.

These and other objects I attain by the construction shown in the accompanying drawing, wherein for the purpose of illustration is shown a preferred embodiment of my invention and wherein:—

Figure 1 is a vertical sectional view through a mixer and aerator constructed in accordance with my invention;

Figure 2 is a plan view partially broken away of the agitator unit;

Figure 3 is a vertical sectional view through a slightly modified form of agitator unit;

Figure 4 is a fragmentary elevation showing the manner of connecting the stop ring to the casing;

Figure 5 is a fragmentary elevation of a slightly modified agitator unit.

Referring now more particularly to the drawing, the numeral 10 indicates a cylindrical open-topped container within which is disposed a plunger 11. The plunger 11 comprises a cylindrical outer wall 12, which may be either provided throughout with perforations or may be simply provided with perforations adjacent its lower edge, as at 13, in Figures 3 and 5.

Where the previous construction is employed, the openings are preferably increased in number adjacent the lower edge of the cylindrical wall, as indicated at 14, in Figure 1. The cylindrical wall in each case is made of considerably less diameter than the container and has at its upper edge a stop means, at present shown as comprising an inturned flange 15 and at its lower end stop means 16, at present disclosed as inturned tabs. Operating between these stops is a flat plate 18 of very slightly less diameter than the internal diameter of the cylindrical wall, this plate being provided with a number of very small perforations, indicated at 19. To this plate, a handle 20 is secured.

It will be obvious that by reciprocating this device in the container, after the plunger has once been submerged in the fluid which is being treated, this fluid will tend to seal the openings 19 so that when the plunger is lifted above the upper level of the fluid and forced downwardly therein, air will be trapped in the hollow plunger formed by the cylindrical wall and the plate. When the plunger reaches the bottom of the casing, the cylindrical wall will engage this bottom and the flat plate will continue its movement, with the result that this air will be forced out of the hollow plunger through the openings in the cylindrical wall and in the plate and will enter the fluid in the form of small bubbles which are readily incorporated therein. The hollow plunger should not have too small a diameter but should be sufficiently small that ample clearance is left between this plunger and the walls of the casing through which material above the plunger may pass without crowding the same to an extent causing breakage of the bubbles therein.

It will be obvious that there will be a certain tendency, when the plate 19 is lifted as the plunger is started on its return stroke, to create a vacuum within the lower end of the hollow plunger and this tendency would result in the air in some of the bubbles which are adjacent the openings of the cylindrical wall and plate passing through these openings, thus destroying the same, and to a certain extent reducing the efficiency of the completed structure. This may be overcome in so far as the plate is concerned by placing upon the upper surface of the plate a second plate 21 through which the handle rod is loosely directed and connecting this plate with the plate 18 by headed elements 22 which are of greater length than the combined thicknesses of the plates, so that the plate 22 may partake of a slight motion with relation to the plate 18. As the plate 18 is moved downwardly, the pressure formed beneath the plate 18 and passing through the openings 19 would tend to lift the plate 22, so that the air might escape. This escape of air can be facilitated by providing the plate 22 with small openings 23 which are staggered with relation to the openings 19 of the plate 18. With either a solid or perforated plate 21, when the plate 18 is drawn upwardly, the tendency to creation of vacuum beneath the plate 18 will cause the plate 21 to seat, sealing the openings of the plate 18 and thereby preventing destruction of bubbles formed above this plate.

It will also be obvious that this tendency to vacuum may be further decreased by causing the cylindrical wall to remain in the position which it occupies at the lowermost limit of its stroke until it has again raised above the level of the liquid being treated.

To this end, I preferably slot the cylindrical wall from its lower end to form circumferentially spaced vertically extending tongues 24 which are pressed inwardly at their lower ends and which are adapted to frictionally engage the plate 18 when it is at the lower limit of its movement and hold this plate and the cylindrical wall against relative movement. The upper end of the wall of the cylindrical container has removably attached thereto a band 25 having portions overhanging the upper end of the container, as indicated at 26, against which the cylindrical wall may strike and thus be forced downwardly upon the plate 18 against the frictional grip of the arms 24. These inwardly extending portions 26 are preferably provided with downturned end portions projecting downwardly into the container so that the plunger need not be lifted to too great an extent. The band 25 may be removably secured in any suitable manner, being at present shown as having cam type bayonet slots, indicated at 27, for coaction with pins 28 carried by the casing.

It will be obvious that apparatus of this character may be very readily constructed and may be very readily manipulated. Since the construction is obviously capable of a certain range of change and modification without materially departing from the spirit of the invention, I do not limit myself thereto except as hereinafter claimed.

I claim:—

1. A combined mixer and aerator comprising a tubular container having one end closed, an agitator within said container comprising an annular wall of less diameter than the container and having small openings formed therethrough, a plate arranged within the annular wall, means at the upper and lower edges of the annular wall for preventing escape of the plate from the wall, said plate having small openings formed therein and having a handle attached thereto whereby the agitator may be reciprocated within the casing.

2. A device as claimed in claim 1 wherein a second plate is superimposed upon the first named plate and has connection therewith permitting limited vertical movement of said second plate with relation to the first named plate.

3. A device as claimed in claim 1 wherein a second plate is superimposed upon the first named plate and has connection therewith permitting limited vertical movement of said second plate with relation to the first named plate, said second plate having small openings formed therein, said openings being out of alignment with the openings of the first named plate.

4. A combined mixer and aerator comprising a tubular container having one end closed, an agitator within said container comprising an annular wall of less diameter than the container and having small openings formed therethrough, a plate arranged within the annular wall, means at the upper and lower edges of the annular wall for preventing escape of the plate from the wall, said plate having small openings formed therein and having a handle attached thereto whereby the agitator may be reciprocated within the casing, the annular wall having means frictionally engaging said plate when the plate is disposed toward the bottom of the annular wall to hold the annular wall in fixed relation to said plate as the plate is lifted, and means carried by the container for engaging the annular wall to thereby cause disengagement of the plate from said means and permit the annular wall to drop.

5. A combined mixer and aerator comprising a tubular container having one end closed, an agitator within said container comprising an annular wall of less diameter than the container and having small openings formed therethrough, a plunger disposed within and fitting the annular wall and having small openings formed therethrough, a handle for reciprocating the plunger within the annular wall, and means limiting the reciprocation of the plunger with respect to the wall.

6. A device as claimed in claim 5 wherein the annular wall has means engaging the plunger when the plunger is in lowered position to frictionally resist relative movement of the plunger and wall and the container has means to engage the annular wall upon a predetermined elevation of the agitator and disengage the plunger from said means.

7. A device as claimed in claim 5 wherein valve means are associated with the plunger to close the openings thereof during elevation of the plunger.

8. A device as claimed in claim 5 wherein the annular wall has means engaging the plunger when the plunger is in lowered position to frictionally resist relative movement of the plunger and wall and the container has means to engage the annular wall upon a predetermined elevation of the agitator and disengage the plunger from said means, and valve means are associated with the plunger for closing the openings thereof during elevation of the plunger.

9. A mixing and aerating agitator, comprising an outer wall member, a plunger member disposed within and fitting the outer wall, a handle for reciprocating the plunger within the outer wall, and means limiting reciprocation of the plunger with respect to the wall, at least one of said members having small openings formed therethrough.

In testimony whereof I affix my signature.

THOMAS A. KILLMAN.